3,291,763
PREPARATION OF POLYMERIC COMPOUNDS
FROM CARBAMIC ESTERS
Alan James Becalick, Poynton, and Geoffrey Arthur Haggis, Manchester, England, assignors to Imperial Chemical Industries Limited, London, England, a corporation of Great Britain
No Drawing. Filed Oct. 4, 1965, Ser. No. 492,910
Claims priority, application Great Britain, Nov. 28, 1961, 42,554/61
6 Claims. (Cl. 260—13)

This application is a continuation-in-part of our application Serial No. 240,159 filed November 26, 1962, now abandoned.

This invention relates to an improved method of preparing polymeric compounds and in particular polymeric compounds containing urethane groups.

It is well known to prepare polymeric compounds by the action of polyisocyanates on compounds containing a plurality of active hydrogen atoms such such as polyhydroxy compounds. Both these components may be non-polymeric or at least one may be of a polymeric nature in which latter case the result of the process is to provide polymers in which the properties of the original polymer have been modified by the increase in the degree of polymerisation and/or by cross-linking.

The use of polyisocyanates to prepare such polymers has some disadvantages; the polyisocyanates are toxic and so reactive that storage difficulties arise. Further, owing to preparative difficulties, the use of these compounds is largely restricted to the preparation of polymers in which the urethane groups are attached through the nitrogen atoms to a carbon atom in an aryl or substituted alkyl group.

We have now found that polymeric materials especially useful for plastics, fibres and, more especially, surface coatings can be prepared from polyhydroxy, amino-hydroxy or polyamino compounds and aryl, aralkyl, alkyl or cycloalkyl esters of certain carbamic acids. These carbamic esters have the important property of easy solubility in the reaction medium, are non-toxic, and present no unusual storage problems.

According to our invention we provide a process for the preparation of polymeric materials comprising the interaction of at least one polyhydroxy, amino-hydroxy or polyamino compound and at least one carbamic ester of the formula $X(NH.CO_2R)_n$ wherein $n$ is the numeral 2 or 3, R is an alkyl, aryl, aralkyl or cycloalkyl group, and X is a —CO—, —SO$_2$— or 1:3:5-triazinyl group.

The value of $n$ is 2 when the group X is a CO or SO$_2$ group, and 3 when X is a 1:3:5-triazinyl group.

The alkyl groups present in the alkyl carbamic acid esters can be of any length and useful polymers will be obtained. However, esters having alkyl groups of 10 carbon atoms or less are preferred to those having a larger number of carbon atoms since the alcohol liberated during the reaction is less difficult to remove. On the other hand the methyl and ethyl esters are not so readily soluble in the reaction mixtures and do not afford as satisfactory polymers as the slightly higher alkyl esters. It is therefore preferred, as a general rule, to use an alkyl ester in which the alkyl groups contain 3 to 10 carbon atoms more especially 3, 4 or 5 carbon atoms, and above all the secondary alkyl groups of this range. That is to say, whilst esters containing methyl, ethyl, hexyl, octyl and decyl groups yield satisfactory polymers, it is preferred to use propyl, butyl and amyl esters, including the straight chain, but more especially the branched radicals of these kinds.

As examples of aryl groups represented by R there may be mentioned monocyclic aryl groups, for example phenyl, tolyl (i.e., cresyl esters) and xylyl, also dicyclic aryl groups, for example α- and β-naphthyl. As examples of aralkyl and cycloalkyl groups represented by R there come into consideration benzyl, cyclohexyl and 2-methyl cyclohexyl.

The carbamic esters useful in our invention may be readily obtained by methods known in the art for example by interaction of an aryl, aralkyl, alkyl or cycloalkyl urethane with a halogeno compound. For example a CO group may be introduced by the use of phosgene, an SO$_2$ group by the use of sulphuryl chloride and triazinyl groups by the use of cyanuric chloride. Other reactive compounds may be used instead of the chloro compounds, for example, bromo compounds. In cases where the polyisocyanate is available, for example sulphuryl diisocyanate, the carbamic esters can also be made by reaction of this with the appropriate alcohol or phenol.

The carbamic esters wherein X is a CO group are especially useful in the process of our invention since these compounds are readily accessible and provide polymeric products which are particularly resistant to solvents and abrasion and free from discolouration.

As examples of specific carbamic esters suitable for use in the process there may be mentioned, carbonyl-di-(ethylcarbamate), carbonyl-di-(n-propylcarbamate), carbonyl-di-(isopropylcarbamate), carbonyl-di-(n-butylcarbamate), carbonyl-di-(isobutylcarbamate), carbonyl-di-(sec-butylcarbamate), carbonyl-di-(n-amylcarbamate), carbonyl-di-(cyclohexylcarbamate), carbonyl-di-(2-methylcyclohexylcarbamate), carbonyl-di-(phenylcarbamate), carbonyl-di-(p-cresylcarbamate), carbonyl-di-(benzylcarbamate), N:N'-sulphuryl-bis-(ethylcarbamate), cyanuryl-tris-(n-amylcarbamate), carbonyl-di-(isooctylcarbamate) and carbonyl-di-(hexyl carbamate). Of particular interest are mixtures of the kind obtained by phosgenation of a mixture of two different carbamic esters, for example, the product of phosgenation of a mixture of sec-butyl and isopropyl carbamates which contains not only carbonyl-di-(isopropyl carbamate) and carbonyl-di-(secbutyl carbamate), but also the mixed biscarbamate N-(carbo-isopropoxy)-N'-(carbo-sec-butoxy) urea. Such mixtures have the advantage of being more soluble in and/or compatible with a wider variety of polyhydroxy compounds than are the individual components of the mixture.

Examples of polyhydroxy compounds suitable for use in the process of the present invention include such polyhydroxy compounds as are known from the prior art as useful in the manufacture of polyurethanes. Thus the polyhydroxy compound may be a non-polymeric compound such as a polyalcohol, for example ethylene glycol, butane-1:4-diol, trimethylolpropane, or it may be a polymeric compound for example a hydroxyl-ended polyether, hydroxyl-ended polyester, polyvinyl alcohol or cellulosic material.

As examples of polyethers there may be mentioned hydroxyl-ended polymers and co-polymers of cyclic oxides, for example 1:2-alkylene oxides such as ethylene oxide, epichlorhydrin, 1:2-propylene oxide, 1:2-butylene oxide and 2:3-butylene oxide, oxacyclobutane and substituted oxacyclobutanes, and tetrahydrofuran. Such polyethers may be linear polyether glycols as are prepared, for example by the polymerization of an alkylene oxide in the presence of a basic catalyst, such as potassium hydroxide and a glycol or a primary monoamine. Alternatively, there may be used branched polyethers prepared for example by the polymerisation of an alkylene oxide in the presence of a basic catalyst and a substance having more than two active hydrogen atoms per molecule, for example ammonia and polyhydroxy compounds such as glycerol, hexanetriols, trimethylolethane, triethanolamine, pentaerythritol, sorbitol, sucrose and phenol-formaldehyde reaction products, amino-alcohols such as monoethanolamine and diethanolamine and polyamines such as ethylene diamine, tolylene diamine and diaminodiphenylmethane. Branched polyethers may also be produced by copolymerising a cyclic oxide of the type already mentioned with cyclic oxides having a functionality greater than two, for example di-epoxides, glycidol and 3-hydroxymethyloxacyclobutanes.

As polyesters there may be mentioned polyesters made from polycarboxylic, particularly dicarboxylic, acids and polyhydric alcohols. Suitable dicarboxylic acids include aliphatic acids, for example succinic, glutaric, adipic, suberic, azelaic and sebacic acids as well as aromatic acids such as phthalic, isophthalic and terephthalic acids. Mixtures of such acids, or mixtures of such with acids containing more than two carboxylic acid groups, may be used. Examples of polyhydric alcohols include glycols such as ethylene glycol, 1:2-propylene glycol, 1:3-butylene glycol, 2:3-butylene glycol, diethylene glycol, tetramethylene glycol, and 2:2-dimethyltrimethylene glycol. Other polyhydric alcohols containing more than two hydroxyl groups per molecule may be used, for example tri- and tetrahydric alcohols such as hexan-triol, trimethylol propane, trimethylolethane, pentaerythritol and glycerol.

Polymeric products with particularly good resistance to solvents, acids and alkalis are obtained by using highly branched polyethers and polyesters, especially polyesters which are the reaction products of polyhydric alcohols having at least three hydroxyl groups per molecule, such as glycerol or trimethylolpropane, with dicarboxylic acids such as phthalic or adipic or mixtures of such acids.

As examples of aminohydroxy compounds there may be mentioned ethanolamine, 6-aminohexan-1-ol, diethanolamine, and polyesteramides. As examples of polyamines there may be mentioned hexamethylene diamine, m- and p-phenylenediamines, polyethyleneimine, and amino-ended polyamides and polyureas.

If desired mixtures of polyhydroxy, aminohydroxy and polyamino compounds may be used, and in the case of polymeric polyhydroxy compounds it may be of advantage to interact the carbamic ester first in excess with a non-polymeric compound containing more than 2 hydroxyl groups, such as trimethylolpropane, and then with the polymeric polyhydroxy compound.

The interaction of the carbamic ester and the polyhydroxy compound may be carried out conveniently by heating the components together at a temperature between 50° and 250° C. and preferably between 150 and 200° C.

In the production of polymers from non-polymeric components it is usually desirable that the amounts of reactants should be such that there are substantially equimolecular amounts of carbamic ester groups and reactive hydrogen atoms. In those cases where polymeric compounds are being used, and particularly when such polymeric compounds contain many active hydrogen atoms, for example polyvinyl alcohol, cellulose, small proportions of carbamic esters are sufficient to modify the properties of the polymer to a useful degree.

If desired, particularly in the manufacture of surface coatings, solvents such as ketones, esters, alcohols, or hydrocarbons may be used. Catalysts may also be of value, including those of the general type used as ester interchange catalysts, for example metal oxides, tetrabutyl titanate, and dibutyl tin dilaurate.

By the process of our invention polymeric materials having a wide range of properties may be conveniently obtained. The process is particularly valuable for the production of lacquers and surface coatings for example on substrates such as glass and metal.

Such lacquers are characterized by good hardness and gloss, coupled with good resistance to corrosion, weathering and chemical attack and by a very good resistance to discoloration in light.

Other ingredients normally used in the production of polymeric materials may also be present, for example pigments, antioxidants, flame retarders. It is desirable in the case of lacquers to incorporate substances which are known to improve the flow properties of lacquers, e.g., ethyl cellulose, cellulose acetobutyrate or a butylated urea/formaldehyde resin.

The invention is illustrated but not limited by the following examples in which all parts and percentages are by weight unless otherwise stated.

*Example 1*

100 parts of a polyester resin of hydroxyl value 280 mg.KOH/gm. (prepared from 7.2 molecular proportions of 1:2:6-hexane triol, 5 molecular proportions of adipic acid and 1 molecular proportion of phthalic anhydride) and 20 parts of a butylated urea-formaldehyde resin are dissolved in 200 parts of diacetone alcohol. To the solution is added 103 parts of carbonyl-di(ethylcarbamate) (N:N'-dicarbethoxy urea) dissolved in 207 parts of diacetone alcohol. The mixed solutions are applied to 3 glass surfaces, which are heated for periods of 15, 30 and 45 minutes at 150° C. to give insoluble films having Sward Rocker Hardnesses of 4, 6 and 13, respectively.

*Example 2*

A solution is prepared from 100 parts of a trimethylolpropane/phthalic anhydride resin of hydroxyl value 300 mg.KOH/gm., 20 parts of a butylated urea-formaldehyde resin, 75 parts of N:N'-carbonyl-bis-amyl carbamate, 80 parts of methyl isobutyl ketone and 20 parts of cyclohexanone. The solution is applied to a glazed porcelain tile and heated for 30 minutes at 180° C. The resulting film is of excellent color and shows no significant yellowing on exposure to U.V. light for 20 hours. A similar film, in which the carbonyl-bis-amyl carbamate is replaced by 390 parts of a 50% solution in methylethylketone of a curing agent derived from tolylene diisocyanate, glycerol, diethylene glycol and phenol shows severe yellowing under the same test conditions.

The carbonyl-bis-amyl carbamate used above is prepared as follows:

765 parts of technical amyl alcohol and 120 parts of urea are heated together at the boil with stirring for 30 hours, ammonia being evolved. The excess amyl alcohol is removed by distillation to leave a crystalline solid which is dissolved in 700 parts of petroleum ether, and filtered. The filtrate is distilled to recover the petrol and to yield 204.4 parts of mixed amyl carbamates, boiling between 111 and 120° C., at a pressure of 13 mm. of mercury. 200 parts of this material are dissolved in 120.6 parts of dry pyridine and added slowly to a stirred cooled solution of 112 parts of phosgene in 1000 parts of dry benzene, the temperature being kept below 10° C. The temperature is then allowed to rise to room temperature and after 16 hours the reaction is completed by heating for 2 hours at the boiling point. The mixture is then cooled and 300 parts of water are added. After thorough stirring the benzene layer is separated and evaporated to leave a residue of 200 parts of a brown syrupy liquid, after filtration to remove a small amount of suspended solid.

*Example 3*

A solution is prepared from 50 parts of a trimethylolpropane/adipic acid resin of hydroxyl value 646 mg.KOH/gm., 50 parts of a polyester resin of hydroxyl value 210 mg.KOH/gm. (prepared from 1 molecular proportion of glycerol, 3 molecular proportions of diethylene glycol and 3 molecular proportions of adipic acid), 20 parts of a butylated urea-formaldehyde resin, 107 parts of carbonyl-bisamyl carbamate, 106.4 parts of methylisobutylketone and 26.6 parts of cyclohexanone. The solution is applied to a glazed porcelain tile and cured by stoving for 30 minutes at 180° C. The resulting film is colourless and remained so after exposure to U.V. light for 20 hours, whereas a similar composition in which the carbonyl-bis-amyl carbamate is replaced by 550 parts of a 50% solution in methylethylketone of a curing agent derived from tolylene diisocyanate, glycerol, diethylene glycol and phenol shows severe yellowing under the same conditions.

Example 4

A solution is prepared from 20 parts of a trimethylol propane/adipic acid resin of hydroxyl value 646 mg.KOH/g., 4 parts of a butylated urea-formaldehyde resin, 16 parts of a methyl isobutyl ketone, and 4 parts of sextone. To this solution is added 65.5 parts of the carbonyl-bis-amyl carbamate used in Example 2. Similar solutions are prepared in which the curing agent is (b) 65.5 parts of carbonyl bis-n-amyl carbamate.
(c) 59.4 parts of carbonyl bis(n-butyl carbamate).
(d) 59.4 parts of carbonyl bis(sec-butyl carbamate).
(e) 72 parts of carbonyl bis(cyclohexyl carbamate).
(f) 92 parts of a trimethylol propane/N:N'-di-carbethoxy urea reaction product.

The solutions are applied to mild steel panels, which are then heated at 180° C. for 30 minutes. The resulting films show good resistance to discoloration and corrosion. Steel rods coated with the lacquer of Example 4(e), and cured 30 minutes at 180° C. are immersed in 25% aqueous sodium hydroxide solution and in 25% hydrochloric acid for 4 weeks, without significant deterioration of the films. The curing agent (b), (c), (d), (e) are prepared by a similar process to that described in Example 2, and are crystalline solids, having the following M.P.'s after crystallization from petroleum ether.

N:N'-carbonyl-bis-n-amyl carbamate —47° C.
N:N'-carbonyl-bis-n-butyl carbamate —59–60° C.
N:N'-carbonyl-bis-sec-butyl carbamate —103–4° C.
N:N'-carbonyl-bis-cyclohexyl carbamate —131–133° C.

The trimethylolpropane/dicarbethoxy urea reaction product used in (f) above is prepared as follows: A mixture of 97 parts of N:N'-dicarbethoxy urea and 21 parts of trimethylolpropane is heated to 150° C., while passing a slow stream of nitrogen gas through the mixture until a considerable increase in viscosity occurs. The resinous product is dissolved in an equal weight of methyl isobutyl ketone and filtered to remove some insoluble matter.

Example 5

4.7 parts of butane-1:4-diol and 10.4 parts of N:N'-dicarbethoxy urea are heated at 155° C. in a stream of nitrogen until 2.3 parts of ethanol have been collected. Vacuum is then applied and heating continued until a highly viscous polymer is obtained. The polymer softens at about 50° C. and can be drawn into a fibre.

Example 6

6 parts of N:N'-sulphuryl-bis-(ethylcarbamate) N:N'-dicarbethoxysulphamide) and 2 parts of butane-1:4-diol are heated at 155° C. in a stream of nitrogen until no more ethanol is evolved. Vacuum is then applied and heating continued to give a dark viscous polymer.

Example 7

A solution is prepared from 20 parts of a trimethylolpropane phthalic anhydride resin of hydroxyl value 280 mg.KOH/gm., 4 parts of a butylated urea-formaldehyde resin, 17 parts of N:N'-carbonyl-bismethylcyclohexyl carbamate, 40 parts of methylisobutylketone and 10 parts of cyclohexanone. The solution is applied to glazed porcelain tiles and mild steel panels and heated for 30 minutes at 180° C. The film produced is of excellent color and hardness and shows good stability towards heat and light. The N:N'-carbonyl-methylcyclohexyl carbamate is prepared from a technical methylcyclohexanol, which is a mixture of isomers, by reaction with phosgene, followed by ammonia; the resulting mixture of carbamates is converted to the product as described in Example 2 for the amyl compound.

Example 8

A solution is prepared from 20 parts of the polyester resin of Example 1, 2 parts of a butylated urea-formaldehyde resin, 14.7 parts of cyanuryl tris(n-amyl-carbamate), 16 parts of methylisobutylketone, 4 parts of cyclohexanone, 14.7 parts of diacetone alcohol and 0.05 part of a 10% solution of dibutyl tin dilaurate. A film is prepared from the solution by application to a glazed porcelain tile and heating for 30 minutes at 180° C.

Cyanuryltris(n-amyl carbamate) is prepared as follows:
7.7 parts of sodium metal are added to a stirred solution of 43.7 parts of n-amyl carbamate in 320 parts of dry xylene. The temperature is raised to 100° C. and heating continued until the sodium has completely reacted. The resulting suspension is cooled to room temperature and 21.5 parts of cyanuric chloride added. After heating at 100° C. for 48 hours the mixture is cooled and water added. The mixture is stirred well and the xylene layer removed, dried and evaporated to leave 37.7 parts of product as a viscous yellow oil.

Example 9

42.8 parts of a polyether resin containing three amino groups per molecule (prepared by the reaction of 2-aminomethyl-3:4-dihydro-2-H-pyran with oxypropylated trimethylolpropane) and 1 part of ethyl cellulose are dissolved in 40 parts of methyl isobutyl ketone and a solution of 26 parts of N:N'-carbonyl-bis-secbutyl carbamate in 40 parts of methyl isobutyl ketone and 20 parts of cyclohexanone is added. The mixture is applied to a glazed porcelain tile and heated for 30 minutes at 180° C. The resulting film is hard and insoluble in most organic solvents.

Example 10

41.4 parts of a polyether resin of hydroxy value 270 mg.KOH/gm. and 4.9 amino groups per molecule (prepared by the reaction of 2-amino-methyl-3:4-dihydro-2-H-pyran with oxypropylated sorbitol) and 1 part of cellulose acetobutyrate are dissolved in 40 parts of methyl isobutyl ketone, and a solution of 26 parts of N:N'-carbonyl-bis-(isobutylcarbamate) in 40 parts of methylisobutyl ketone and 20 parts of cyclohexanone is added. The mixture is applied to a glazed porcelain tile and heated for 30 minutes at 180° C. The resulting hard film is insoluble in most organic solvents.

Example 11

22.9 parts of a polyether resin of hydroxyl value 73 mg.KOH/gm. (prepared by oxypropylating sorbitol) is dissolved in 40 parts of methyl isobutyl ketone, and a solution of 23.2 parts of N:N'-carbonyl-bis-isopropyl carbamate in 40 parts of methylisobutyl ketone and 20 parts of cyclohexanone is added. The mixture is applied to a glazed porcelain tile and heated for 1 hour at 180° C. The resulting hard film is of good colour and is insoluble in most organic solvents.

Example 12

20 parts of secondary cellulose acetate is dissolved in 80 parts of acetone and the solution is added to a solution of 36 parts of N:N' - carbonyl-bis-sec·butyl carbamate in 40 parts of methylisobutylketone and 20 parts of cyclohexanone. The mixture is applied to a glazed tile and heated for 1 hour at 180° C. To a similar tile is applied a solution of 20 parts of secondary acetate dissolved in 80 parts of acetone and this is also heated for 1 hour at 180° C. The film obtained from from the secondary acetate/carbonyl-bis-carbamate film has better solvent resistance than the film obtained from secondary acetate alone.

Example 13

A solution is prepared by dissolving 100 parts of a hexane triol/phthalic anhydride/adipic acid resin of hydroxy value 280 mg.KOH/gm. and 75 parts of N:N'-carbonyl-bisphenyl-carbamate in 80 parts of methyl isobutyl ketone and 20 parts of cyclohexanone. The solution is applied to a glazed porcelain tile and heated for 30 minutes at 150° C. The resulting film is of excellent colour and hardness and is insoluble in most organic solvents.

If in the above example the 75 parts of carbonyl di(phenylurethane) is replaced by 82 parts of carbonyl di(p-cresylcarbamate) or 82 parts of carbonyl di(benzylcarbamate) films having substantially the same properties are obtained.

Example 14

100 parts of a polyester resin of hydroxyl value 280 mg.KOH/gm. (prepared from hexane triol adipic acid and phthalic anhydride) is dissolved in 80 parts of methylisobutyl ketone. To the solution is added 58 parts of N:N'-carbonyl-di(propylcarbamate) dissolved in 80 parts of methylisobutyl ketone and 40 parts of cyclohexanone. The solution is applied to a glazed porcelain tile and heated for ¾ hour at 180° C. The resulting film is of excellent colour and shows no significant yellowing on exposure to U.V. light for 20 hours.

Example 15

12.3 parts of a polyester resin solution (prepared from 15 parts of the polyester used in Example 1 and 10 parts of methylisobutyl ketone, 2.5 parts of cyclohexanone and 2.5 parts of Cellosolve acetate) is added to a suspension of 61.7 parts of rutile titanium dioxide in 16 parts methyl-isobutylketone, 4 parts of Cellosolve acetate and 4 parts of cyclohexanone and the mixture is milled.

10.5 parts of the milled mixture and 8.7 parts of the 50% polyester solution described above are added to a solution of 3.1 parts of a mixture of carbonyl bisurethanes (obtained by phosgenation of an equimolecular mixture of secbutyl and isopropyl carbamates) in 3.1 parts of methylisobutylketone. The mixture is applied to a steel panel and heated at 180° C. for ½ hour. The resulting hard white finish has good mar resistance and good colour retention.

Example 16

If in Example 15, the 3.1 parts of the mixture of carbonyl bisurethanes are replaced by 2.33 parts of the same mixture, the resulting film still has substantially the same properties.

Example 17

6 parts of the polyester resin used in Example 1 is dissolved in a mixture of 3 parts of methylisobutylketone, 1 part of cyclohexanone, 1 part of toluene and 1 part of Cellosolve acetate. The solution is added to a solution of 3.7 parts of the mixture of carbonyl-bisurethanes used in Example 15 dissolved in 2.5 parts of Cellosolve acetate and 1.2 parts of toluene. The mixture is applied to a glazed tile and heated at 180° C. for 30 minutes. The resulting clear film has excellent mar resistance and stability to U.V. light.

We claim:
1. A process for preparing polymeric materials which comprises heating together at a temperature of from 50 to 250° C., (a) at least one member selected from the group consisting of nonpolymeric polyalcohols, low molecular weight mono-amino alcohols, polyamines, hydroxyl-ended polyesters, hydroxyl-ended polyethers, polyvinyl alcohol, cellulose and cellulose esters and (b) up to a substantially equivalent amount of at least one carbamic ester of the formula $X(NH \cdot CO_2R)_n$ where $n$ is a number selected from 2 and 3, R is selected from the group consisting of alkyl, aryl, aralkyl and cycloakyl groups, and X is selected from the group consisting of CO, $SO_2$ and 1,3,5-triazinyl.

2. A process as claimed in claim 1 wherein the carbamic ester is interacted first in excess with a compound (a) which is a non-polymeric compound containing more than 2 hydroxyl groups and then with a compound (b) which is a polymeric polyhydroxy compound.

3. A process for coating substrates which comprises applying thereto a lacquer having as essential film-forming constituents (a) at least one polyester containing hydroxyl groups, (b) at least one carbonyl bis(alkyl carbamate) in which the alkyl groups have from 3 to 5 carbon atoms and thereafter heating the substrate at at temperature of from 150° to 200° C.

4. A process as claimed in claim 3 wherein the polyester is a reaction product of an aliphatic di-carboxylic acid and an aromatic dicarboxylic acid with a trihydric alcohol.

5. A process as claimed in claim 4 wherein the polyester is a reaction product of a trihydric alcohol and a mixture of adipic and phthalic acids.

6. A process for coating substrates which comprises applying thereto a lacquer having as essential film-forming ingredients (a) at least one polyester containing hydroxyl groups and (b) carbonyl bis(phenylcarbamate) and thereafter heating the substrate at a temperature of 150 to 200° C.

References Cited by the Examiner
UNITED STATES PATENTS

| | | | |
|---|---|---|---|
| 2,929,800 | 3/1960 | Hill | 260—77.5 |
| 2,946,768 | 7/1960 | Klauke et al. | 260—77.5 |

LEON J. BERCOVITZ, *Primary Examiner.*

J. J. KLOCKO, *Assistant Examiner.*